US010316925B2

(12) United States Patent
Maeda (10) Patent No.: US 10,316,925 B2
(45) Date of Patent: Jun. 11, 2019

(54) VIBRATION DAMPING DEVICE (71) Applicant: BRIDGESTONE CORPORATION, Tokyo (JP)

(72) Inventor: Naoki Maeda, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/561,127

(22) PCT Filed: Feb. 2, 2016

(86) PCT No.: PCT/JP2016/053004
§ 371 (c)(1),
(2) Date: Sep. 25, 2017

(87) PCT Pub. No.: WO2016/157990
PCT Pub. Date: Oct. 6, 2016

(65) Prior Publication Data
US 2018/0128343 A1 May 10, 2018

(30) Foreign Application Priority Data
Mar. 31, 2015 (JP) .................. 2015-074398

(51) Int. Cl.
*F16F 13/10* (2006.01)
*B60K 5/12* (2006.01)
(52) U.S. Cl.
CPC .............. *F16F 13/101* (2013.01); *B60K 5/12* (2013.01); *F16F 13/10* (2013.01); *F16F 13/107* (2013.01); *B60K 5/1291* (2013.01)
(58) Field of Classification Search
CPC ........ F16F 13/10; F16F 13/101; F16F 13/107; B60K 5/12
See application file for complete search history.

(56) References Cited

U.S. PATENT DOCUMENTS

| 9,366,308 B2 | 6/2016 | Kojima |
| 2006/0043656 A1 | 3/2006 | Shimizu |

(Continued)

FOREIGN PATENT DOCUMENTS

| CN | 1743696 A | 3/2006 |
| CN | 103339406 A | 10/2013 |

(Continued)

OTHER PUBLICATIONS

International Search Report for PCT/JP2016/053004 filed Apr. 19, 2016.

(Continued)

*Primary Examiner* — Vishal R Sahni
(74) *Attorney, Agent, or Firm* — Sughrue Mion, PLLC (57) ABSTRACT

According to the present invention, there is provided a vibration damping device (10) including a first bracket (11) and a second bracket (12), a first attachment member (14), a second attachment member (15), and an elastic body (16). The second attachment member (15) includes an insertion cylinder portion (22) in which the second bracket (12) is inserted. The insertion cylinder portion (22) is provided with a stopper portion (56) which faces a stopper wall (55) provided in the first bracket (11), in a radial direction (Y) in a side wall portion (57) oriented outward in the radial direction (Y) of the insertion cylinder portion (22). The stopper portion (56) includes a first stopper portion (61) and a second stopper portion (62) which are disposed in a manner of being displaced in an axial direction (X) of the insertion cylinder portion (22). The first stopper portion (61) is constituted by a first elastic portion (58). The second stopper portion (62) includes a rigid member (25). A first distance (D1) between the first stopper portion (61) and the stopper wall (55) in the radial direction (Y) is equal to or shorter than a second distance (D2) between the second (Continued)

stopper portion (62) and the stopper wall (55) in the radial direction (Y).

4 Claims, 6 Drawing Sheets

(56) References Cited

U.S. PATENT DOCUMENTS

| | | | |
|---|---|---|---|
| 2007/0178258 A1* | 8/2007 | Petit | F16F 13/10 |
| | | | 428/34.1 |
| 2013/0313399 A1 | 11/2013 | Tsutsumi et al. | |
| 2015/0129742 A1* | 5/2015 | Okanaka | B60K 5/1208 |
| | | | 248/634 |
| 2015/0184717 A1 | 7/2015 | Kojima | |
| 2016/0040747 A1* | 2/2016 | Hayashi | B60K 5/1208 |
| | | | 267/141 |
| 2016/0238102 A1* | 8/2016 | Goto | B60K 5/1208 |
| 2017/0122398 A1* | 5/2017 | Michiyama | B60K 5/1208 |

FOREIGN PATENT DOCUMENTS

| | | | |
|---|---|---|---|
| DE | 10 2005 033 509 A1 | | 1/2007 |
| EP | 1026420 B1 | | 8/2003 |
| EP | 1681152 | * | 7/2006 |
| FR | 2926862 A1 | | 7/2009 |
| JP | 11-280828 A | | 10/1999 |
| JP | 2008-045641 A | | 2/2008 |
| JP | 2008-248898 A | | 10/2008 |
| JP | 2009-196512 A | | 9/2009 |
| WO | 2011148576 A1 | | 12/2011 |
| WO | 2014021108 A1 | | 2/2014 |
| WO | WO2015012072 | * | 1/2015 |
| WO | WO2015166716 | * | 11/2015 |

OTHER PUBLICATIONS

Communication dated Jun. 19, 2018 from the European Patent Office in counterpart EP application No. 16771874.1.
Communication dated Sep. 4, 2018 from the State Intellectual Property Office of the P.R.C. in counterpart application No. 2016800173563.

\* cited by examiner

VIBRATION DAMPING DEVICE

TECHNICAL FIELD

The present invention relates to a vibration damping device, for example, which is applied to automobiles and industrial machine and absorbs and attenuates a vibration of a vibration generating portion such as an engine.

Priority is claimed on Japanese Patent Application No. 2015-074398 filed on Mar. 31, 2015, the content of which is incorporated herein by reference.

BACKGROUND ART

Patent Document1 discloses a known vibration damping device in the related art. The vibration damping device includes a first bracket that is connected to any one of a vibration generating portion and a vibration receiving portion, a second bracket that is connected to the other thereof, a first attachment member that is mounted in the first bracket, a second attachment member that is mounted in the second bracket, and an elastic body that connects the first attachment member and the second attachment member with each other. The second attachment member includes an insertion cylinder portion in which the second bracket is inserted.

CITATION LIST

Patent Document

[Patent Document 1] Japanese Unexamined Patent Application, First Publication No. 2009-196512

SUMMARY OF INVENTION

Technical Problem

However, in the vibration damping device in the related art, there is room for improvement in regard to preventing a spring constant of a first stopper portion from increasing immediately after the first stopper portion constituted by a first elastic portion comes into contact with a stopper wall due to a vibration in a radial direction of an insertion cylinder portion, and restraining excessive relative displacement between a first bracket and a second bracket when the vibration is input.

The present invention has been made in consideration of the foregoing circumstances and an object thereof is to provide a vibration damping device in which a spring constant of a stopper portion is prevented from increasing and excessive relative displacement between brackets is restrained immediately after the stopper portion comes into contact with the stopper wall when a vibration is input.

Solution to Problem

In order solve the foregoing problem, the present invention proposes means as follows.

According to a first spect of the present invention, there is provided a vibration damping device including a first bracket that is connected to any one of a vibration generating portion and a vibration receiving portion, and a second bracket that is connected to the other thereof; a first attachment member that is mounted in the first bracket; a second attachment member that is mounted in the second bracket; and an elastic body that connects the first attachment member and the second attachment member with each other. The second attachment member includes an insertion cylinder portion into which the second bracket is inserted. The insertion cylinder portion is provided with a stopper portion which faces a stopper wall provided in the first bracket, in a radial direction in a side wall portion oriented outward in the radial direction of the insertion cylinder portion. The stopper portion includes a first stopper portion and a second stopper portion which are disposed in a manner of being displaced in an axial direction of the insertion cylinder portion. The first stopper portion is constituted by a first elastic portion. The second stopper portion includes a rigid member. A first distance between the stopper portion and the stopper wall in the radial direction is equal to or shorter than a second distance between the second stopper portion and the stopper wall in the radial direction.

Advantageous Effects of Invention

According to the vibration damping device of the present invention, it is possible to prevent a spring constant of the stopper portion from increasing and to restrain excessive relative displacement between the brackets imrrrediately after the stopper portion comes into contact with the stopper wall when a vibration is input.

DESCRIPTION OF EMBODIMENT

Hereinafter, with reference to FIGS. 1 to 6, a vibration damping device according to an embodiment of the present invention will be described.

As illustrated in FIGS. 1 to 5, a vibration damping device 10 includes a first bracket 11 which is connected to any one of a vibration generating portion and a vibration receiving portion, a second bracket 12 which is connected to the other thereof, and a vibration damping device main body 13 which connects the vibration generating portion and the vibration receiving portion with each other via both the brackets. The vibration damping device 10 is a so-called engine mount allowing an engine which is the vibration generating portion in a vehicle (not illustrated) to be supported by a vehicle body which is the vibration receiving portion. In the vibration damping device 10 of this kind, for example, small vibrations are input during idling and during acceleration and deceleration. On the other hand, large vibrations arc input during traveling on a rough road, during rapid acceleration, during a sudden stop, and the like.

Figure 1:
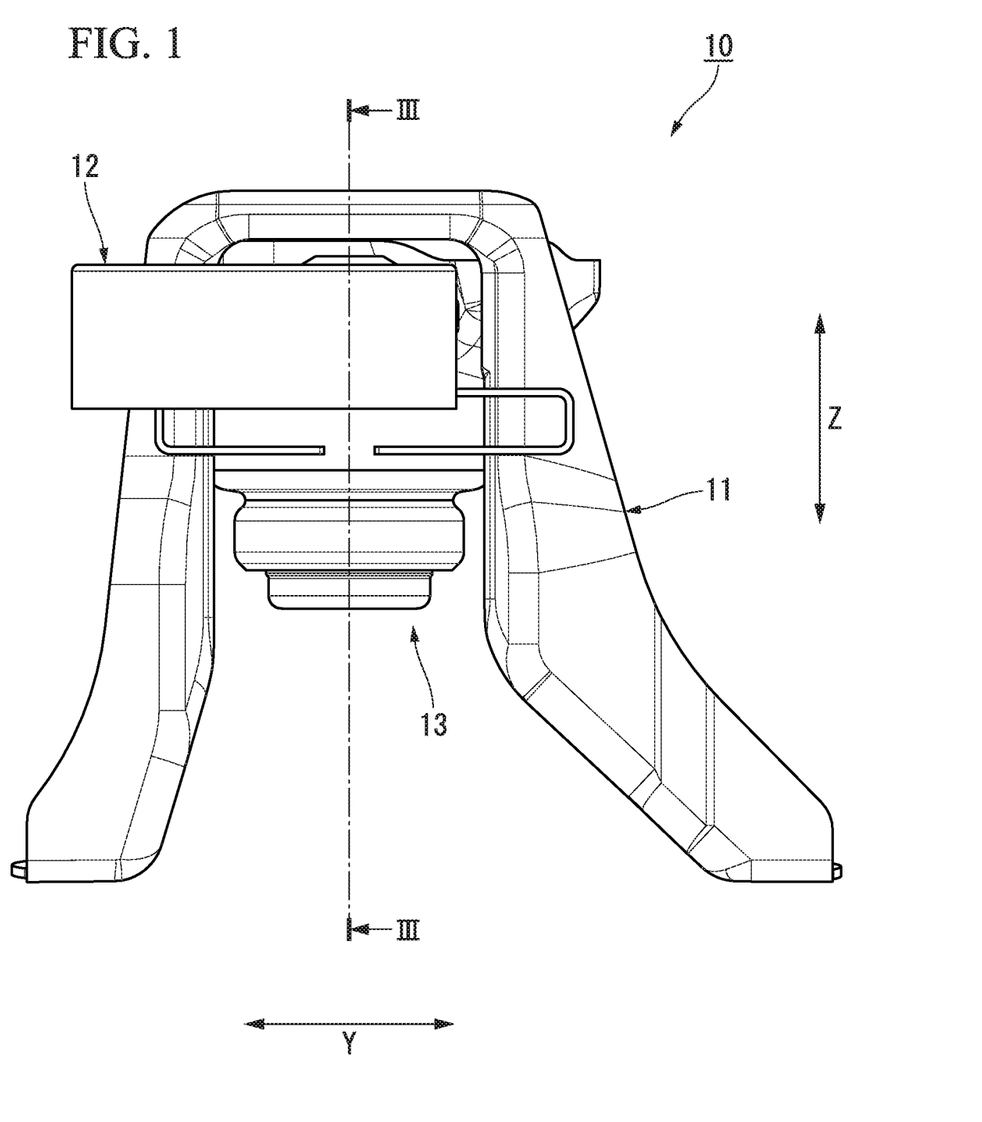
FIG. 1 is a front view of a vibration damping device according to an embodiment of the present invention.
Figure 2:
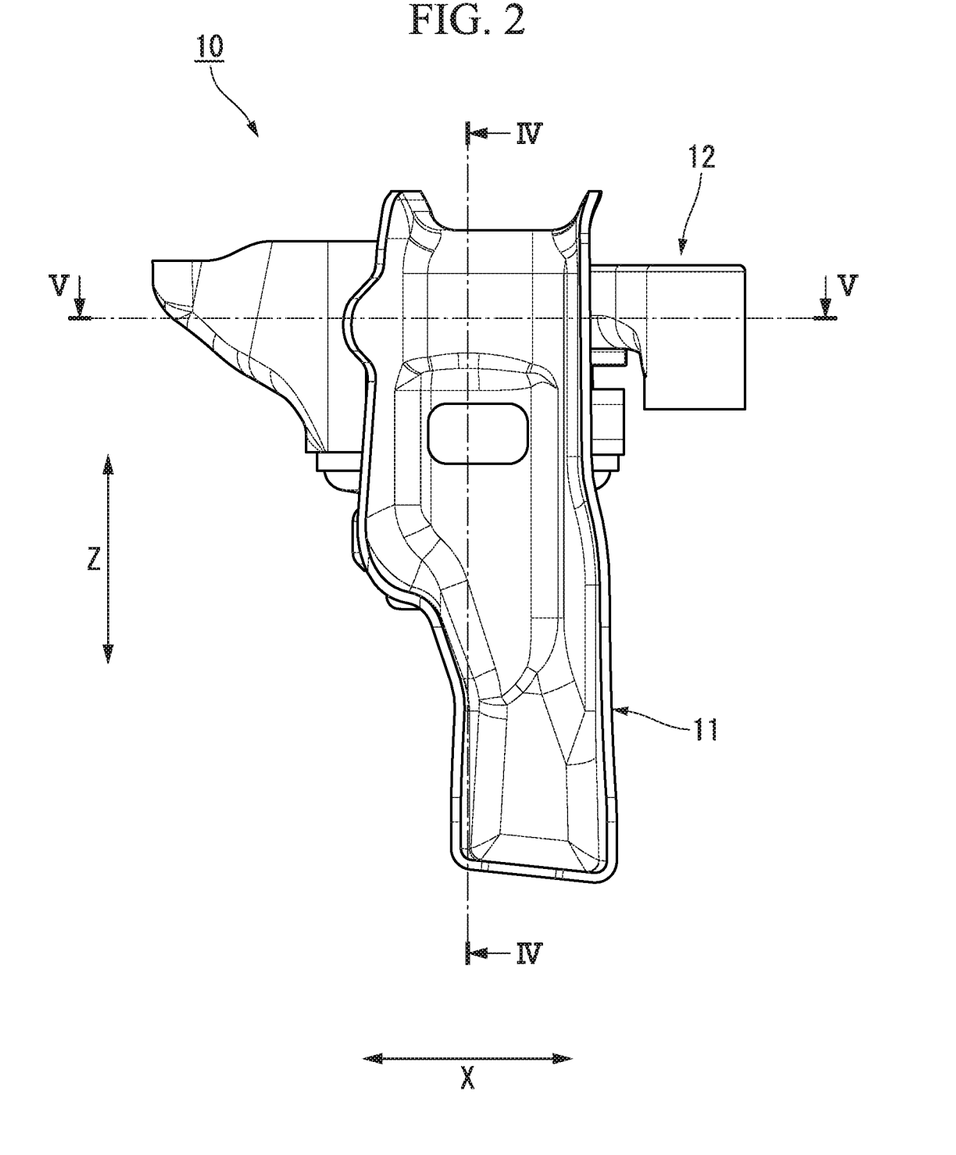
FIG. 2 is a side view of the vibration damping device illustrated in FIG. 1.
Figure 3:
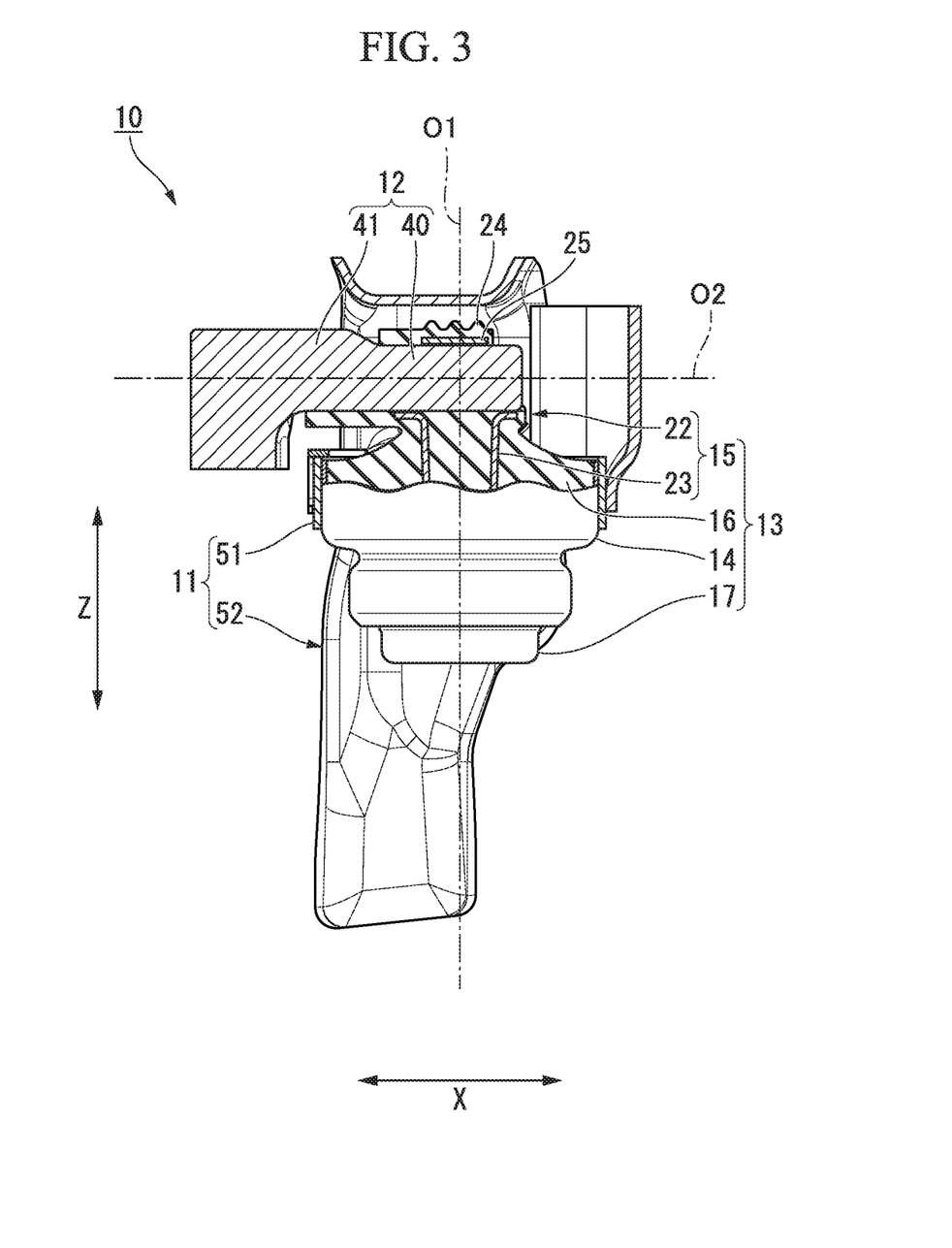
FIG. 3 is a sectional arrow view taken along line III-III illustrated in FIG. 1.
Figure 4:
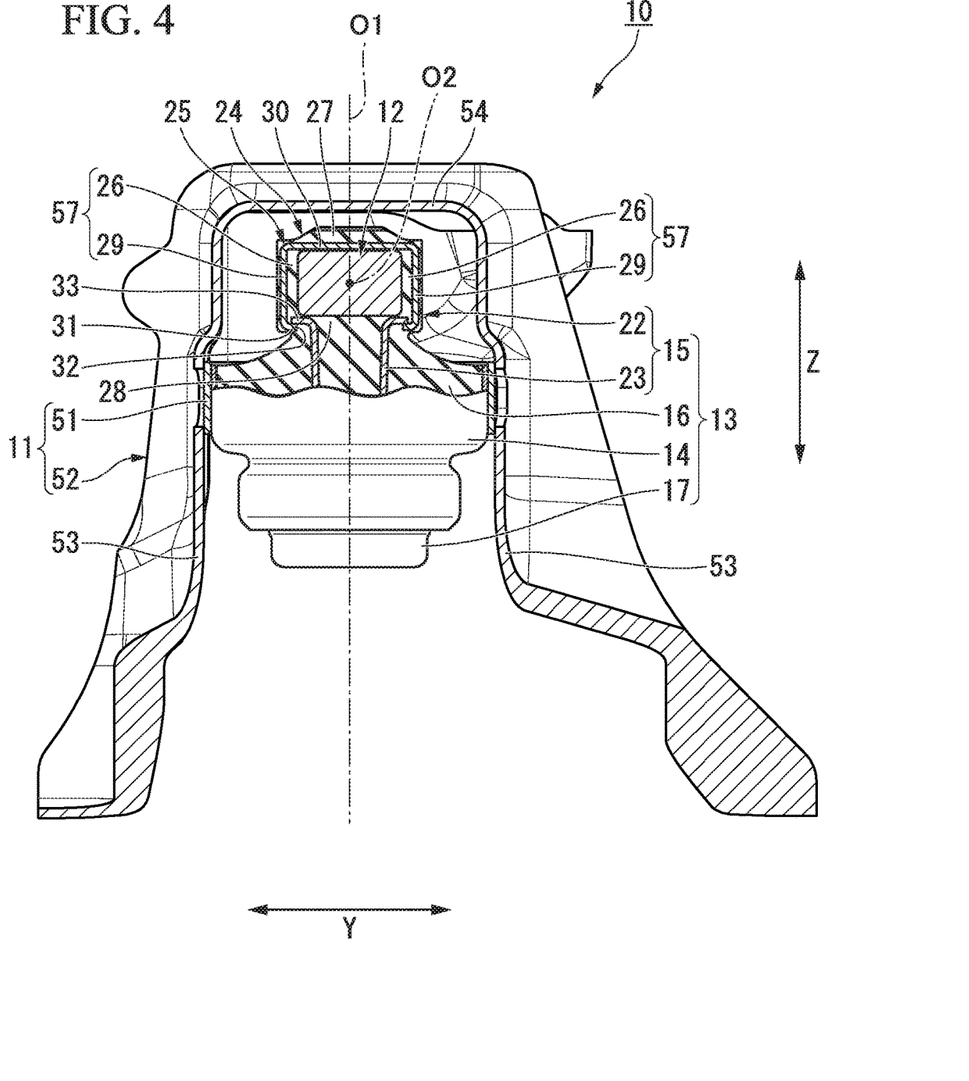
FIG. 4 is a sectional arrow view taken along line IV-IV illustrated in FIG. 2.

As illustrated in FIGS. 3 and 4, the vibration damping device main body 13 includes a first attachment member 14 which is mounted in the first bracket 11, a second attachment member 15 which is mounted in the second bracket 12, and an elastic body 16 which connects the first attachment member 14 and the second attachment member 15 with each other. The first attachment member 14 is formed in a cylindrical shape. Hereinafter, a direction along the central axis line of the first attachment member 14 (central axis line of the vibration damping device main body 13) (hereinafter, will be referred to as "first axis line O1") will be referred to as vertical direction Z. When the vibration damping device 10 is attached to the vehicle, a bound side on which a dead load (initial load) is input along the vertical direction Z will be referred to as lower side and a rebound side which is the opposite side thereof will be referred to as upper side.

A lower end opening portion of the first attachment member 14 is blocked by a diaphragm 17, and an upper end opening portion of the first attachment member 14 is blocked by the elastic body 16. For example, the elastic body 16 and the diaphragm 17 are each formed of an elastic material such as rubber. Inside the first attachment member 14, a portion positioned between the elastic body 16 and the diaphragm 17 serves as a liquid chamber (not illustrated) filled with liquid consisting of ethylene glycol, water, and silicone oil, for example.

The liquid chamber is defined into a main iquid chamber (not illustrated) having the elastic body 16 as part of a division wall, and a sub-liquid chamber (not illustrated) having the diaphragm 17 as part a division wall, by means of a partition member (not illustrated). The main liquid chamber and the sub-liquid chamber communicate with each other via an orifice (not illustrated) formed in the partition member. The orifice generates liquid-column resonance (resonance) when the liquid circulates. In the vibration damping device 10, when a vibration is input, the liquid inside the liquid chamber circulates between the main liquid chamber and the sub-liquid chamber through the orifice, and the liquid-column resonance generated during the circulation absorbs and attenuates vibrations.

The second attachment member 15 includes an insertion cylinder portion 22 and an embedded rigid body 23.

The insertion cylinder portion 22 is disposed at a position where the first axis line O1 passes through. The central axis line of the insertion cylinder portion 22 (hereinafter, will be referred to as "second axis line O2") is orthogonal to the first axis line O1. Hereinafter, a direction along the second axis line O2 will be referred to as axial direction X (axial direction of the insertion cylinder portion 22), and a direction orthogonal to both the axis lines of the first axis line O1 and the second axis line O2 will be referred to as orthogonal direction Y (radial direction of the insertion cylinder portion 22).

The insertion cylinder portion 22 includes an elastic member 24 and a rigid member 25.

The elastic member 24 is formed in a cylindrical shape coaxial with the second axis line O2. As illustrated in FIG. 4, the elastic member 24 is formed in a rectangular shape, in a front view when seen in the axial direction X. The elastic member 24 includes a pair of side elastic walls 26 disposed while having a space therebetween in the orthogonal direction Y, an upper elastic wall 27 connecting upper end portions of the pair of side elastic walls 26 together, and a lower elastic wall 28 connecting lower end portions of the pair of side elastic walls 26 together.

The elastic member 24 is integrally formed with the elastic body 16 using the same material. The louder elastic wall 28 is connected to the elastic body 16 from the upper side. As illustrated in FIG. 3, central portion of the elastic member 24 in the axial direction X is displaced in the axial direction X with respect to the first axis line O1. Hereinafter, a direction in which the central portion of the elastic member 24 is displaced along the axial direction X with respect to the first axis line O1 will be referred to as a first side in the axial direction X, and the opposite side thereof will be eferred to as a second side.

As illustrated in FIG. 4, the rigid member 25 is embedded in the elastic member 24, and the surface of the rigid member 25 is firmly fixed to (subjected to vulcanization bonding on) the elastic member 24. The rigid member 25 is in a cylindrical shape coaxial with the second axis line O2. The rigid member 25 is formed in a rectangular shape in a front view when seen in the axial direction X. The rigid member 25 includes a pair of side rigid walls 29 disposed while having a space therebetween in the orthogonal direction Y, an upper rigid wall 30 connecting upper end portions of the pair of side rigid walls 29 together, and a lower rigid wall 31 connecting lower end portions of the pair of side rigid walls 29 together. An opening portion 32 penetrating the lower rigid wall 31 in the vertical direction Z is formed in the lower rigid wall 31. The opening portion 32 is formed throughout the length of the lower rigid wall 31 in the axial direction X.

As illustrated in FIG. 3, the rigid member 25 is disposed at a position where the first axis line O1 passes therethrough.

A central portion of the rigid member 25 in the axial direction X is displaced toward the second side in the axial direction X with respect to the central portion of the elastic member 24 in the axial direction X, and the elastic member 24 protrudes from the rigid member 25 toward the first side in the axial direction X.

As illustrated in FIGS. 3 and 4, the embedded rigid body 23 is embedded in the elastic body 16 and the elastic member 24, and the surface of the embedded rigid body 23 is firmly fixed to (subjected to vulcanization bonding on) the elastic body 16 and the elastic member 24. The embedded rigid body 23 is formed as a body separate from the rigid member 25 and protrudes downward from the inside of the rigid member 25 through the opening portion 32. The embedded rigid body 23 is formed in a cylindrical shape coaxial with the first axis line O1. An annular flange portion 33 protruding outward is provided in an upper end portion positioned inside the rigid member 25 in the embedded rigid body 23. The flange portion 33 is provided such that the flange portion 33 can engage with the lower rigid wall 31 in the vertical direction Z.

Figure 5:
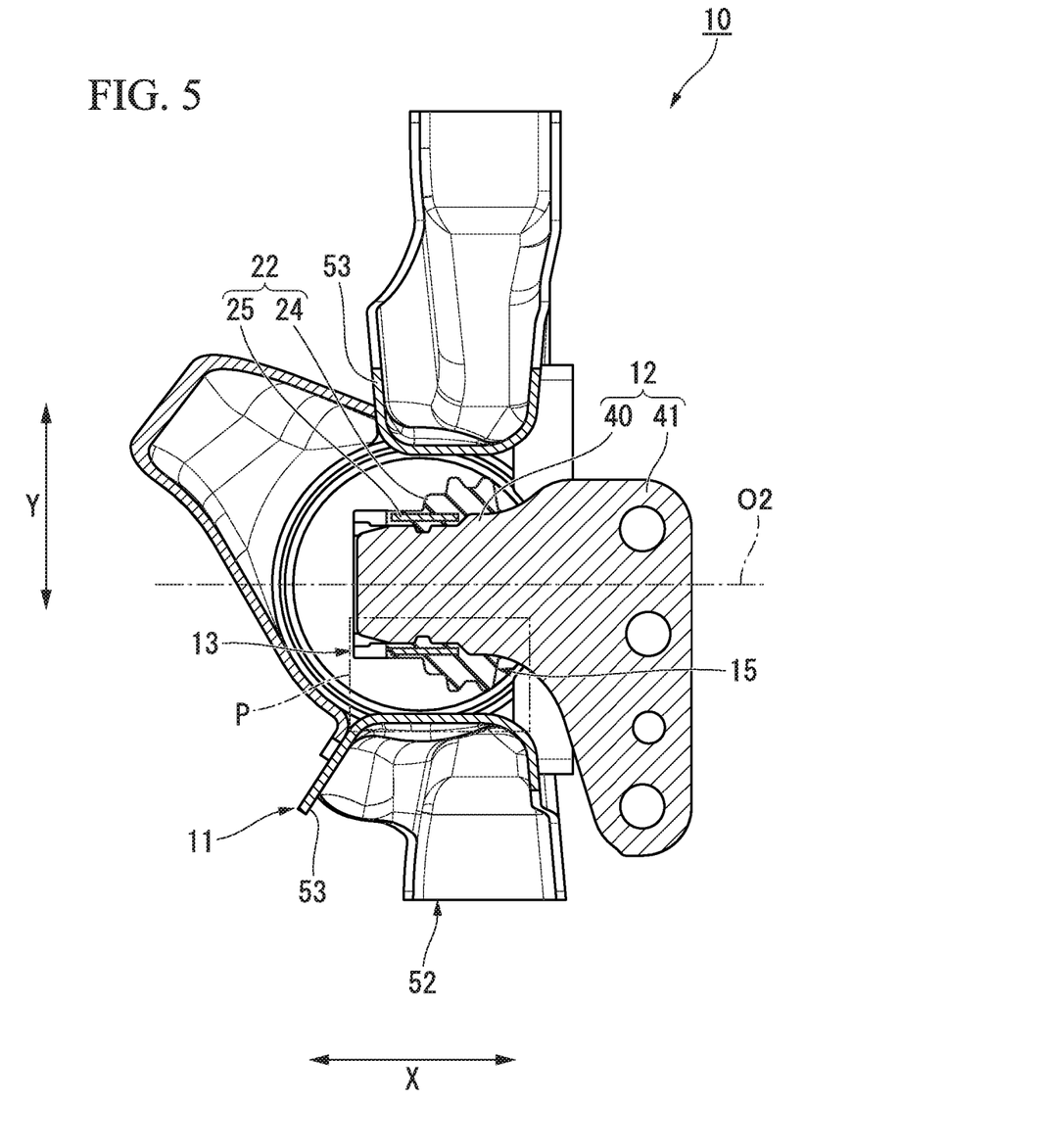
FIG. 5 is a sectional arrow view taken along line V-V illustrated in FIG. 2.
Figure 6:
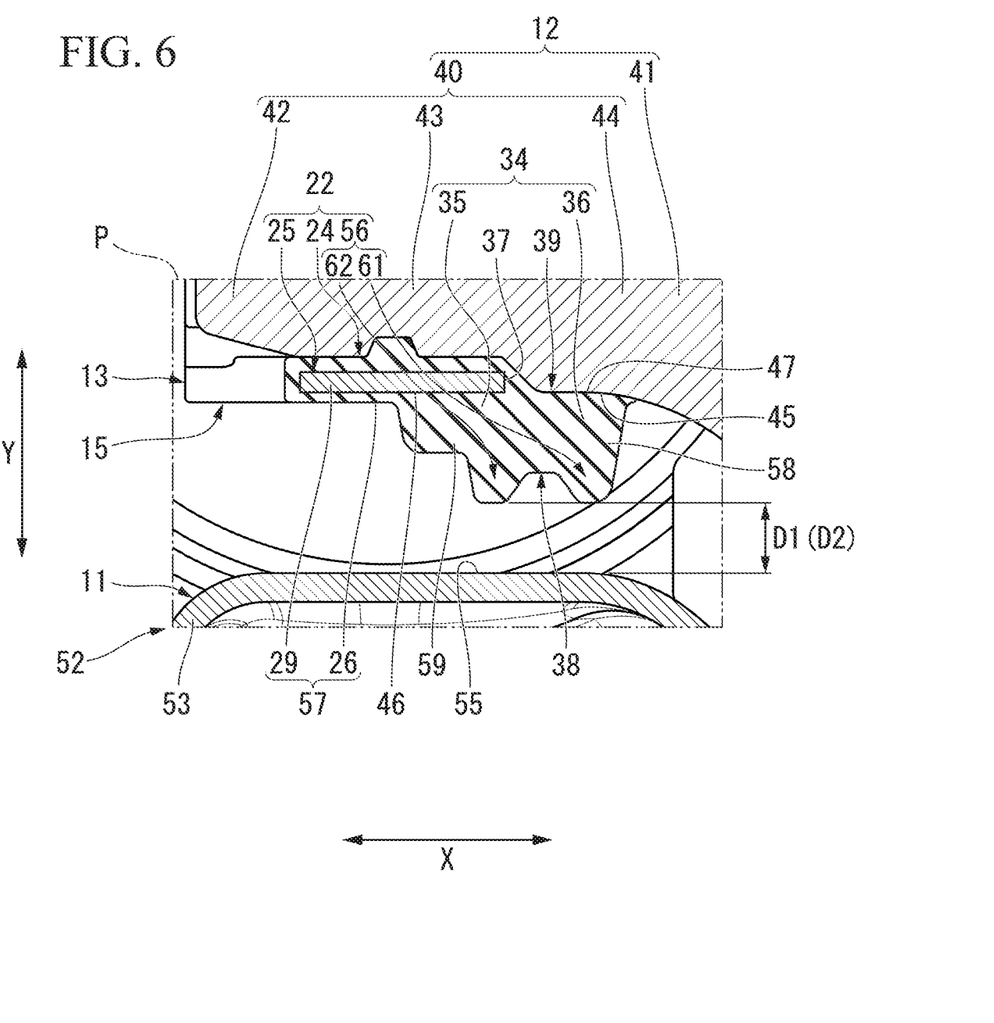
FIG. 6 is an enlarged view of a main portion P illustrated in FIG. 5.

Incidentally, as illustrated in FIGS. 5 and 6, a protrusion portion 34 protruding in the orthogonal direction Y is provided on an outer surface oriented outward in the orthogonal direction Y in the pair of side elastic walls 26 in the elastic member 24. The protrusion portion 34 is disposed in a portion positioned on the first side of the elastic member 24 in the axial direction X. An end portion of the protrusion portion 34 on the second side in the axial direction X is disposed at the same position in the axial direction X as the central portion of the rigid member 25 in the axial direction X.

In the protrusion portion 34, a small protrusion portion 35 and a large protrusion portion 36 are connected in this order toward the first side in the axial direction X. Compared to the large protrusion portion 36, the small protrusion portion 35 is small in the axial direction X and is thin in the orthogonal direction Y. The small protrusion portion 35 is positioned on the second side in the axial direction X beyond an end portion of the rigid member 25 (hereinafter, will be referred to as "first end portion (one end portion) 37") on the first side in the axial direction X. The large protrusion portion 36 extends in the axial direction X such that the large protrusion portion 36 straddles the first end portion 37 of the rigid member 25 in the axial direction X. The large protrusion portion 36 is provided with a recess portion 38 which is depressed in the axial direction X. The recess portion 38 is positioned on the first side in the axial direction X beyond the first end portion 37 of the rigid member 25.

A depression portion 39 depressed in the orthogonal direction Y is provided on an inner face facing inward in the orthogonal direction Y in the pair of side elastic walls 26. The depression portion 39 is formed in the end portion on the first side in the axial direction X in the elastic member 24 and is disposed on the first side in the axial direction X beyond the first end portion 37 of the rigid member 25.

As illustrated in FIG. 5, the second bracket includes an insertion portion 40 which is inserted into the insertion cylinder portion 22, and a connection portion 41 to which the vibration generating portion or the vibration receiving portion is connected. The insertion portion 40 and the connection portion 41 are connected in this order toward the first side in the axial direction X, and the connection portion 41 protrudes from the insertion cylinder portion 22 toward the first side in direction X. In the present embodiment, the first side the axial direction X is the connection portion 41 side (counter-insertion portion 40 side) along the axial direction X, and the second side in the axial direction X is the insertion portion 40 side (counter-connection portion 41 side) along the axial ection X.

The insertion portion 40 is inserted into the insertion cylinder portion 22 toward the second side in the axial direction X. As illustrated in FIG. 6, in the insertion portion 40, a tip end portion 42, a central portion 43 (press-in portion), and a proximal end portion 44 are connected in this order toward the first side in the axial direction X. The tip end portion 42 protrudes from the insertion cylinder portion 22 toward the second side in the axial direction X. The central portion 43 is pressed into a portion in which the rigid member 25 is positioned in the insertion cylinder portion 22.

The proximal end portion 44 is disposed inside a portion in which the depression portion 39 is formed in the insertion cylinder portion 22. The proximal end portion 44 is larger than the central portion 43 in the orthogonal direction Y and bulges toward both sides in the orthogonal direction Y with respect to the central portion 43, so that the proximal end portion 44 faces the rigid member 25 in the axial direction X. An outer surface 45 oriented outward in the orthogonal direction Y in the proximal end portion 44 is disposed at the same position in orthogonal direction Y as an outer surface 46 oriented outward in the orthogonal direction Y in the side rigid walls 29. The outer surface 45 comes into contact with an inner surface 47 facing inward in the orthogonal direction Y in the depression portion 39.

As illustrated in FIGS. 1 to 5 the first bracket 11 includes a amounting cylinder portion 51 in which the first attachment member 14 is mounted, and a main body portion 52 which is fixed to the mounting cylinder portion 51 and to which the vibration generating portion or the vibration receiving portion is connected. The mounting cylinder portion 51 is fitted in the first attachment member 14 from the outside. The main body portion 52 includes a pair of leg wall portions 53 between which the mounting cylinder portion 51 is interposed in the orthogonal direction Y, and a connection wall portion 54 which connects upper end portions of the pair of leg wall portions 53 together. The pair of leg wall portions 53 is individually fixed to the mounting cylinder portion 51.

As illustrated in FIGS. 5 and 6, the first bracket 11 and the insertion cylinder portion 22 are respectively provided with a stopper wall 55 and a stopper portion 56 facing each other in the orthogonal direction Y (radial direction of the insertion cylinder portion 22). The stopper wall 55 is provided in the pair of leg wall portions 53 in the first bracket 11. The stopper wall 55 is provided in a portion positioned on the upper side beyond the mounting cylinder portion 51 in the leg wall portions 53. The stopper portion 56 is provided in a pair of side wall portions 57 oriented outward in the orthogonal direction Y in the insertion cylinder portion 22. The side wall portions 57 are constituted by the side elastic wall 26 and the side rigid walls 29.

The stopper portion 56 includes a first stopper portion 61 and a second stopper portion 62 which are disposed in a manner of being displaced in the axial direction X.

The first stopper portion 61 is positioned on the first side in the axial direction X with respect to the second stopper portion 62. The first stopper portion 61 is constituted by a first elastic portion 58 which is a portion positioned on the first side in the axial direction X beyond the first end portion 37 of the side rigid walls 29 in the elastic member 24. The first elastic portion 58 comes into contact with the outer surface 45 of the insertion portion 40 from the outside in the orthogonal direction Y and is supported by the proximal end portion 44 from the inside in the orthogonal direction Y.

The second stopper portion 62 is constituted by the rigid member 25 and a second elastic portion 59 which is a portion positioned on the second side in the axial direction X beyond the first elastic portion 58 in the elastic member 24. The second elastic portion 59 is firmly fixed to (subjected to vulcanization bonding on) the outer surface 46 of the rigid member 25. The first elastic portion 58 and the second elastic portion 59 (elastic member 24) are integrally formed of the same materials.

A first distance D1 between the first stopper portion 61 and the stopper wall 55 in the orthogonal direction Y is equal to or shorter than a second distance D2 between the second stopper portion 62 and the stopper wall n the orthogonal direction Y. In the present embodiment, the first distance D1 and the second distance D2 are equal to each other.

As described above, according to the vibration damping device 10 of the present embodiment, since the first distance D1 is equal to or shorter than the second distance D2, when a vibration is input from the vibration generating portion to the vibration damping device 10 in the orthogonal direction Y so that the stopper portion 56 and the stopper wall 55 approach each other, in a case where the input from the vibration generating portion is small, the first stopper portion 61 in the stopper portion 56 can be brought into contact with the stopper wall 55. Here, since the first stopper portion 61 is constituted by the first elastic portion 58, it is possible to prevent a spring constant from increasing at that time.

On the other hand, in a case where the input from the vibration generating portion is significant, the second stopper portion 62 in the stopper portion 56 can be brought into contact with the stopper wall 55. Here, since the second stopper portion 62 includes the rigid member 25, it is possible to restrain excessive relative displacement between the first bracket 11 and the second bracket 12 in the orthogonal direction Y at that time.

Consequently, it is possible to prevent the spring constant of the stopper portion from increasing and to restrain excessive relative displacement between the brackets immediately after the stopper portion comes into contact with the stopper wall when a vibration is input.

In addition, since the second stopper portion 62 includes the second elastic portion 59, when the second stopper portion 62 and the stopper wall 55 are to come into contact with each other, instead of causing the stopper wall 55 to directly come into contact with the rigid member 25, the stopper wall 55 can be brought into contact with the rigid member 25 via the second elastic portion 59. Accordingly, it is possible to prevent the spring constant from increasing when a vibration is input in the orthogonal direction Y.

Furthermore, in addition to a configuration in which the second stopper portion 62 merely includes the second elastic portion 59, the second elastic portion 59 is firmly fixed to the outer surface 46 of the rigid member 25. Therefore, when a significant vibration is input in the orthogonal direction Y, the second elastic portion 59 which has been compressively deformed in the orthogonal direction Y can be restrained from being deformed in a manner of escaping in the axial direction X, for example. Accordingly, it is possible to reliably and continuously restrain excessive relative displacement between the bracket and the second bracket 12 in the orthogonal direction Y.

In addition, the first elastic portion 58 and the second elastic portion 59 are integrally formed of the same materials. Therefore, the first elastic portion 58 and the second elastic portion 59 can be easily formed, for example, compared to a case where the first stopper portion 61 and the second stopper portion 62 are formed using a plurality of elastic materials.

The technical scope of the present invention is not limited to the embodiment described above, and various changes can be added without departing from the scope of the gist of the present invention.

For example, the second elastic portion 59 is not essential.

In addition, in the embodiment, the first axis line O1 and the second axis line O2 are orthogonal to each other. However, the present invention is not limited thereto. For example, the second axis line O2 does not have to intersect the first axis line O1.

In addition, in the embodiment, the liquid chamber is provided inside the first attachment member 14. However, the present invention is not limited thereto. For example, the embodiment may have a configuration in which no liquid chamber is provided inside the first attachment member 14, and the first attachment member 14 and the second attachment member 15 are connected to each other simply be the elastic body 16 in the vibration damping device main body 13.

In addition, the present invention is not limited to an engine mount of a vehicle and can also be applied to vibration damping devices 10 other than the engine mount. For example, the present invention may be applied to a mount of a generator loaded in construction machinery or may also be applied to a mount of machinery installed in factories or the like.

Furthermore, without departing from the scope of the gist of the present invention, the configuration elements of the embodiment can be suitably replaced with known configuration elements. In addition, the modification example may be suitably combined.

INDUSTRIAL APPLICABILITY

According to the vibration damping device of the present invention, it is possible to prevent the spring constant of the stopper portion from increasing and to restrain excessive relative displacement between the brackets immediately after the stopper portion comes into contact with the stopper wall when a vibration put.

REFERENCE SIGNS LIST

10 VIBRATION DAMPING DEVICE
11 FIRST BRACKET
12 SECOND BRACKET
14 FIRST ATTACHMENT MEMBER
15 SECOND ATTACHMENT MEMBER
16 ELASTIC BODY
22 INSERTION CYLINDER PORTION
25 RIGID MEMBER
55 STOPPER WALL
56 STOPPER PORTION
57 SIDE WALL PORTION
58 FIRST ELASTIC PORTION
59 SECOND ELASTIC PORTION
61 FIRST STOPPER PORTION
62 SECOND STOPPER PORTION
D1 FIRST DISTANCE
D2 SECOND DISTANCE
X AXIAL DIRECTION
Y ORTHOGONAL DIRECTION (RADIAL DIRECTION)

The invention claimed is:

1. A vibration damping device comprising:
a first bracket configured to connect to any one of a vibration generating portion and a vibration receiving portion, and a second bracket configured to connect to the other thereof;
a first attachment member that is mounted in the first bracket;
a second attachment member that is mounted to the second bracket; and
an elastic body that connects the first attachment member and the second attachment member with each other,
wherein the vibration damping device has a radial direction extending from one longitudinal end of the first bracket to another longitudinal end of the first bracket, and an axial direction transverse to the radial direction extending across a width of the first bracket,
wherein the second attachment member includes an insertion cylinder portion in which the second bracket is inserted,
wherein the insertion cylinder portion is provided with a stopper portion which faces a stopper wall provided in the first bracket, and the stopper portion protrudes outward in the radial direction of the insertion cylinder portion,
wherein the stopper portion includes a first stopper protrusion and a second stopper protrusion which are respectively disposed at different positions in the axial direction of the insertion cylinder portion, with a groove therebetween,
wherein the first stopper protrusion is constituted by a first elastic portion,
wherein the second stopper protrusion includes a rigid member, and
wherein a first distance between the first stopper protrusion and the stopper wall in the radial direction is equal to or shorter than a second distance between the second stopper protrusion and the stopper wall in the radial direction.

2. The vibration damping device according to claim 1, wherein the second stopper protrusion includes a second elastic portion which is firmly fixed to an outer surface of the rigid member oriented outward in the radial direction.

3. The vibration damping device according to claim 2, wherein the first elastic portion and the second elastic portion are integrally formed of the same materials.

4. The vibration damping device according to claim 1, wherein the rigid member is provided only in the second stopper protrusion.

\* \* \* \* \*